July 29, 1924. Re. 15,881

C. W. PRICKETT

CONCRETE AND WOOD FLOOR CONSTRUCTION DEVICE

Original Filed Nov. 1, 1920

Witness
Lynn Latta

Inventor
Clyde W. Prickett
By Bair & Freeman
Attys

Reissued July 29, 1924. Re. 15,881

UNITED STATES PATENT OFFICE.

CLYDE W. PRICKETT, OF WINTERSET, IOWA.

CONCRETE AND WOOD FLOOR CONSTRUCTION DEVICE.

Original No. 1,381,740, dated June 14, 1921, Serial No. 421,020, filed November 1, 1920. Application for reissue filed September 23, 1922. Serial No. 589,990.

*To all whom it may concern:*

Be it known that I, CLYDE W. PRICKETT, a citizen of the United States, and a resident of Winterset, in the county of Madison and State of Iowa, have invented a certain new and useful Concrete and Wood Floor Construction Device, of which the following is a specification.

The object of my invention is to provide a concrete and wood floor construction device of simple and inexpensive construction.

Considerable difficulty is involved in laying a wood floor on a concrete base, and it is my purpose to provide a construction, whereby such a floor can be laid on a concrete base with the parts accurately placed in the proper position and at a minimum expense.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
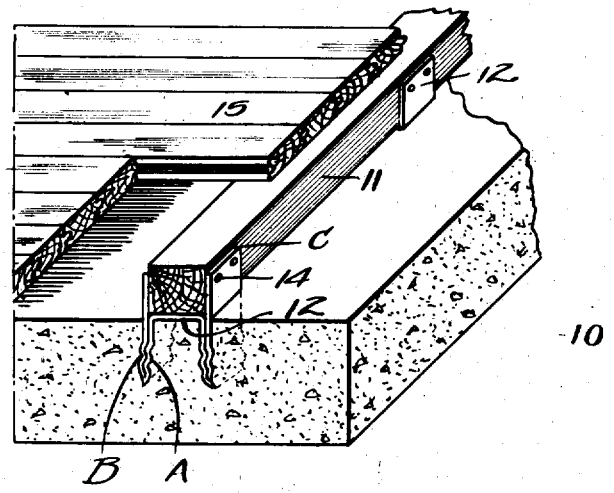
Figure 1 shows a detail, sectional, perspective view of a floor construction embodying my invention.

Ordinarily in laying a wood floor on a concrete base, the concrete base is laid, then sleepers are placed in position on the floor and anchored from the ceiling, so as to hold them in place. Nails or the like are driven into the sleepers, which have preferably one beveled side edge, and an additional layer of thin concrete is poured between the sleepers for anchoring them.

This is a slow and expensive process, which I have sought to avoid by means of my structure herein set forth.

In the accompanying drawings, I have used the reference numeral 10 to indicate generally a concrete base. Properly spaced on the concrete base are sleepers 11.

For fastening the sleepers 11 to the base, I have provided the following means:

I provide a strip of metal, which is bent to form a central, horizontal member 12, from which there extend downwardly arms or portions 13, the lower parts of which are crimped, as illustrated at A. From the lower ends of the arms or portions 13, the strip is bent upwardly on each side, as at B, and crimped, as shown for instance in Figure 2.

The strip is long enough, so that the ends C extend upwardly substantially above the central portion 12. The ends C are provided with holes 14 to receive nails.

Figure 3:
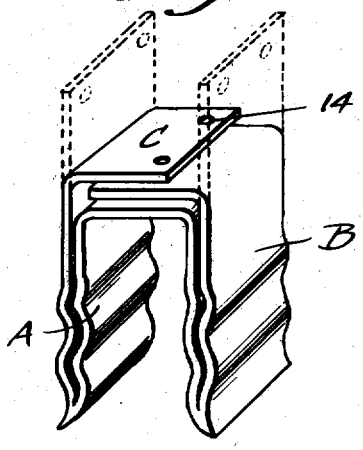
Figure 3 shows a similar view illustrating the arrangement of the fastening devices for shipping and storage and for convenience after installation in the concrete base prior to the laying of the wood floor.

For storage or transportation and for convenience after installation in the concrete base and before the sleepers are placed on such base, the ends C are bent over the member 12 and overlap each other, as illustrated in Figure 3.

When the concrete base 10 is laid, and while the concrete is still soft, the ends A and B are forced down into the concrete, as shown in Figure 1, and the concrete is allowed to set. The bending over of the ends C as in Figure 3, permits free use of the concrete floor without interference by the fastening devices until such time as it is desired to lay the wood floors.

Figure 2:
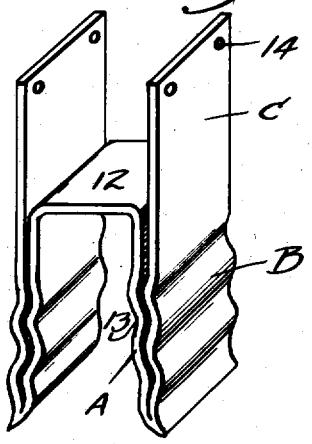
Figure 2 shows a perspective view of the means for fastening the sleepers to the concrete base.

At the proper time, the ends C are bent up to vertical position, as shown in Figure 2, from their positions shown in full lines in Figure 3, and the sleepers 11 are laid between the spaced end members C, as shown in Figure 1, and secured thereto by means of nails driven through the holes 14 into the sleepers.

By the use of the term "crimped" herein, I intend to include corrugations or any form of device having projecting elements for accomplishing proper anchoring in the concrete.

The sleepers will thus be accurately placed and rigidly held in position with relation to the base 10. The flooring may be then nailed to the sleepers in the ordinary way.

By the construction herein shown, it will be seen that I am enabled to accurately and rigidly place the sleepers in proper position with relation to the concrete base with a minimum of labor and expense.

I am able to avoid the anchoring of the sleepers, which is necessary under the old process, which is expensive and involves the use of great care to prevent the slipping of the sleepers from their proper position, and I save the use of material necessary to provide a layer of concrete extending from the base 10 part way up the sleepers 11.

I also greatly reduce the weight of the concrete base, thereby making it possible to use less material and lighter steel through the entire construction, where a building of several stories is under construction.

It will be seen that my process involves the pouring of a concrete base, the forcing therein while soft of the fastening device, having the member 12, which serves as a stop member, the allowing of the concrete to set, the laying of the sleepers and fastening them to the fastening devices, and the laying of the floor on the sleepers.

Changes may be made in the details of the construction of my floor structure and in the practice of my process, without departing from the spirit and purpose of my invention, and it is my intention to cover by my claims, any modified forms of structure or use of mechanical equivalents, or any variations in the steps of the process, which may be included within their scope.

I claim as my invention:

1. A support for concrete and wood floor construction, comprising a single piece of material bent to form a central member, downwardly extending parts at the ends thereof for insertion into a concrete bed, the ends of the downwardly extending parts being re-bent upwardly and projecting upwardly above said central members, for the purpose of receiving a sleeper between them.

2. In a device of the class described, a fastener device comprising a single strip of material having a central member with bent down parts for insertion into a concrete bed, crimped and re-bent upwardly from the lower ends of the bent down parts, and projecting upwardly above said central member to receive a sleeper between them, and provided with openings for fastening said last-described parts to sleepers.

3. In a device of the class described, a fastener device comprising a single strip of material having a central member with bent down parts at the edges thereof for insertion into a concrete bed, having their lower parts crimped and re-bent upwardly from the lower ends of said downwardly extending parts crimped at their lower parts and projecting upwardly above said central member and provided with openings for fastening, said last described parts being made of material, which can be bent over said central member for reducing the bulk of said device for transportation and storage.

4. A clip comprising a body portion adapted to rest upon the surface of a concrete bed, downwardly extending prongs for insertion into the concrete and oppositely disposed, permanently attached extensions for embracing a sleeper.

5. A clip comprising a body portion adapted to rest upon the surface of a concrete bed, downwardly extended prongs for insertion into the concrete, and oppositely disposed extensions adapted to be folded into substantial alignment with the surface of the concrete bed and when vertically extended to embrace the sides of a sleeper.

6. In a floor structure, a concrete bed, rows of aligned sleeper engaging clips, each comprising a body portion adapted to rest upon the surface of the concrete bed, downwardly extended prongs, inserted in the concrete, and oppositely disposed, permanently attached vertical extensions, sleepers disposed upon said body portions and between the extensions of the respective clips, and a wooden floor laid on said sleepers.

Des Moines, Iowa, September 19, 1922.

CLYDE W. PRICKETT.